United States Patent
Newman et al.

(10) Patent No.: US 7,626,791 B2
(45) Date of Patent: Dec. 1, 2009

(54) ELECTRICAL FAULT DETECTION

(75) Inventors: Richard D Newman, Manningtree (GB); Campbell D Booth, Clydebank (GB)

(73) Assignee: Rolls-Royce plc, London (GB)

( * ) Notice: Subject to any disclaimer, the term of this patent is extended or adjusted under 35 U.S.C. 154(b) by 174 days.

(21) Appl. No.: 11/730,735

(22) Filed: Apr. 3, 2007

(65) Prior Publication Data

US 2007/0238362 A1 Oct. 11, 2007

(30) Foreign Application Priority Data

Apr. 6, 2006 (GB) ................................. 0606904.1

(51) Int. Cl.
*H02H 3/093* (2006.01)
(52) U.S. Cl. ......................................................... 361/63
(58) Field of Classification Search .................... 361/63
See application file for complete search history.

(56) References Cited

U.S. PATENT DOCUMENTS

| 4,530,025 | A | * | 7/1985 | Usui | ............................ | 361/87 |
|---|---|---|---|---|---|---|
| 4,812,943 | A | * | 3/1989 | Jones et al. | ................. | 361/93.9 |
| 5,311,392 | A | * | 5/1994 | Kinney et al. | ............... | 361/93.2 |
| 2004/0027748 | A1 | * | 2/2004 | Kojovic et al. | ................. | 361/62 |
| 2004/0156154 | A1 | * | 8/2004 | Lazarovich et al. | ........... | 361/42 |

FOREIGN PATENT DOCUMENTS

| GB | 1 266 046 SP | 3/1972 |
|---|---|---|
| JP | 2001251751 AB | 9/2001 |

* cited by examiner

*Primary Examiner*—Stephen W Jackson
*Assistant Examiner*—Ann T Hoang
(74) *Attorney, Agent, or Firm*—Jeffrey S. Melcher; Manelli Denison & Selter PLLC (57) ABSTRACT

A DC electrical current busbar associated with electrical load circuits and devices as well as sources requires protection. In order to provide such protection Kirchoff's laws are utilized such that electrical current values are substantially simultaneously taken and summed in order to identify deviations from expected differential threshold values. Upon detection of such deviations and generally as a result of a number of successive deviations an electrical isolation device is utilized in order to isolate electrical current to the busbar. The data set of electrical current values can be utilized in order to provide a back up protection system for individual electrical load devices and circuits, by similar comparison with expected values for those devices and circuits.

14 Claims, 11 Drawing Sheets

Current flows for rail-earth fault

Fig.6.

Current flows for load supply circuit rail-earth fault

Fig.7. Current flows for load supply circuit rail-line fault

Fig.8.

Current flows for load line-line fault

ELECTRICAL FAULT DETECTION

FIELD OF THE INVENTION

The present invention relates to electrical fault detection and more particularly to electrical fault detection within a direct current electrical busbar system and in the electrical circuitry coupled to said busbar particularly but not exclusively used in aerospace applications.

BACKGROUND OF THE INVENTION

It will be appreciated that electrical fault detection is important in order to protect intrinsic electrical equipment as well as to avoid potential hazards with respect to electrocution, fires and potentially erroneous results. In some safety critical situations such as within aerospace applications it is important to provide fault detection efficiently and in view of the safety critical consequences of failure to rapidly detect a problem appropriately.

It is known to provide a busbar as an electrical distribution network so that a number of electrical devices and circuitry may take electrical power for their operation whilst electrical generators provide electrical power to the busbar. A busbar is essentially coupled to electrical circuitry in order to allow the circuitry to draw the necessary power from that busbar for their operation. In such circumstances if there is a fault in one of the devices or electrical circuits taking electrical power from the busbar or a fault in the busbar itself there can be problems with respect to excessive electrical current flows or potentially power or electrical distribution problems with respect to electrical power distribution. Problems with an electrical generator supplying the busbar may create difficulties and instability in the electrical distribution network.

The traditional solution of individually hardwiring each electrical circuitry device results in complex wiring looms and particularly in situations such as aerospace applications can significantly add to weight and power loss. Thus, safe and efficient provision of busbar operation is desirable.

SUMMARY OF THE INVENTION

In accordance with the present invention there is provided an electrical fault protection arrangement including a busbar, at least one source of direct electrical current connected to the busbar, at least one electrical load circuit connected to the busbar, a plurality of sensors to obtain electrical current values, the sensors are arranged to obtain electrical current values for all electrical currents entering the busbar and all electrical currents leaving the busbar, a controller coupled to the sensors to receive all of the electrical current values, the controller is arranged to sum all the electrical current values from all the sensors to produce a summation value, the controller is arranged to compare the summation value with a threshold value stored in the controller to provide a control signal for controlling an isotation device to electrically isolate the busbar.

Typically the controller includes a counter to count the number of times the control signal is provided before the isolation device is controlled to electrically isolate the busbar.

Preferably, the controller is arranged to compare the electrical current values for the at least one electrical load circuit with an expected value stored in the controller to provide a control signal for an isolation device to electrically isolate the at least one electrical load circuit.

Typically the controller includes a counter to count the number of times the control signal is provide before the isolation device is controlled electrically isolate the at least one electrical load circuit.

Preferably there are a plurality of electrical load circuits.

Preferably the electrical load circuit includes an electrical device.

Typically the sensors are arranged to obtain electrical current values in terms of magnitude and direction.

Typically the electrical fault protection arrangement is arranged in an aircraft or a ship.

Also in accordance with the present invention there is provided a method of electrical fault protection for an arrangement including a busbar, at least one source of direct electrical current connected to the busbar, at least one electrical load circuit connected to the busbar, the method comprising:— a) sensing electrical current values for all electrical currents entering the busbar and all electrical currents leaving the busbar, b) summing all the electrical current values to produce a summation value, c) comparing the summation value with a threshold value to provide a control signal for controlling an isolation device for the busbar dependent upon the comparison between the summation value and the threshold value.

Preferably the method comprises comparing the electrical current values for the at least one electrical load circuit with an expected value for the at least one electrical load circuit to provide a control signal for an isolation device for the at least one electrical load circuit dependent upon the comparison between the electrical current values and the expected value.

Typically, the method also comprises counting the number of times the control signal is provided before the isolation device is controlled to electrically isolate the busbar.

Typically the method also comprises counting the number of times the control signal is provided before the isolation device is controlled to electrically isolate the at least one electrical load circuit.

Preferably there are a plurality of electrical load circuits.

Preferably the electrical load circuit includes an electrical device.

Typically the method comprises sensing the electrical current values in terms of magnitude and direction.

Preferably the arrangement is arranged on an aircraft or a ship.

DESCRIPTION OF THE DRAWINGS

Embodiments of the present invention will be now described by way of example and with reference to the accompanying drawings in which:—

DETAILED DESCRIPTION OF THE INVENTION

Known electrical fault protection systems are based upon measurement of electrical current differentials and are used in a number of power system applications. These differential protection systems are based upon Kirchhoff's electrical current rule which states that all electrical currents entering and leaving a node in a system should vectorially sum to zero neglecting electrical system losses associated with the detection apparatus etc. It will be appreciated that these systems operate on a basis that should the summation under Kirchhoff's law result in a differential comparison which is greater than an acceptable level to take account of losses, then it can be deduced that there is an electrical fault within the system and this should either be notified or the system isolated for protection purposes.

It will be understood that busbar electrical power distribution systems are advantageous in reducing the electrical power transmission equipment requirements for powering individual electrical circuitry and devices. Essentially the busbar provides a mains transmission node from which electrical power can be drawn and a marshalling point for multiple circuits. Such mains distribution busbars are being adapted for use within aerospace environments in view of the benefits provided. However, it will be appreciated in respect of aerospace applications there is a safety critical principle and therefore it is necessary to provide a dedicated differential protection system for the main distribution busbar.

The present electrical fault detection arrangement operates by calculating the vector sum of all the electrical currents entering and leaving a busbar. As indicated above in accordance with Kirchhoff's law the vector summation of all the electrical currents should essentially equal zero under all operating conditions but ignoring losses and measurement errors. If a non-zero result is calculated, that is to say outside of an acceptable tolerance range, then it can be deduced that there is a busbar fault. Furthermore, through applying differential methods and comparison of current magnitudes against previously-determined thresholds, the protection system may establish the presence of faults on the load electrical circuits or the load devices themselves; this may be viewed as an auxiliary protection function to the primary function of fault detection and protection of the busbar.

Figure 1:
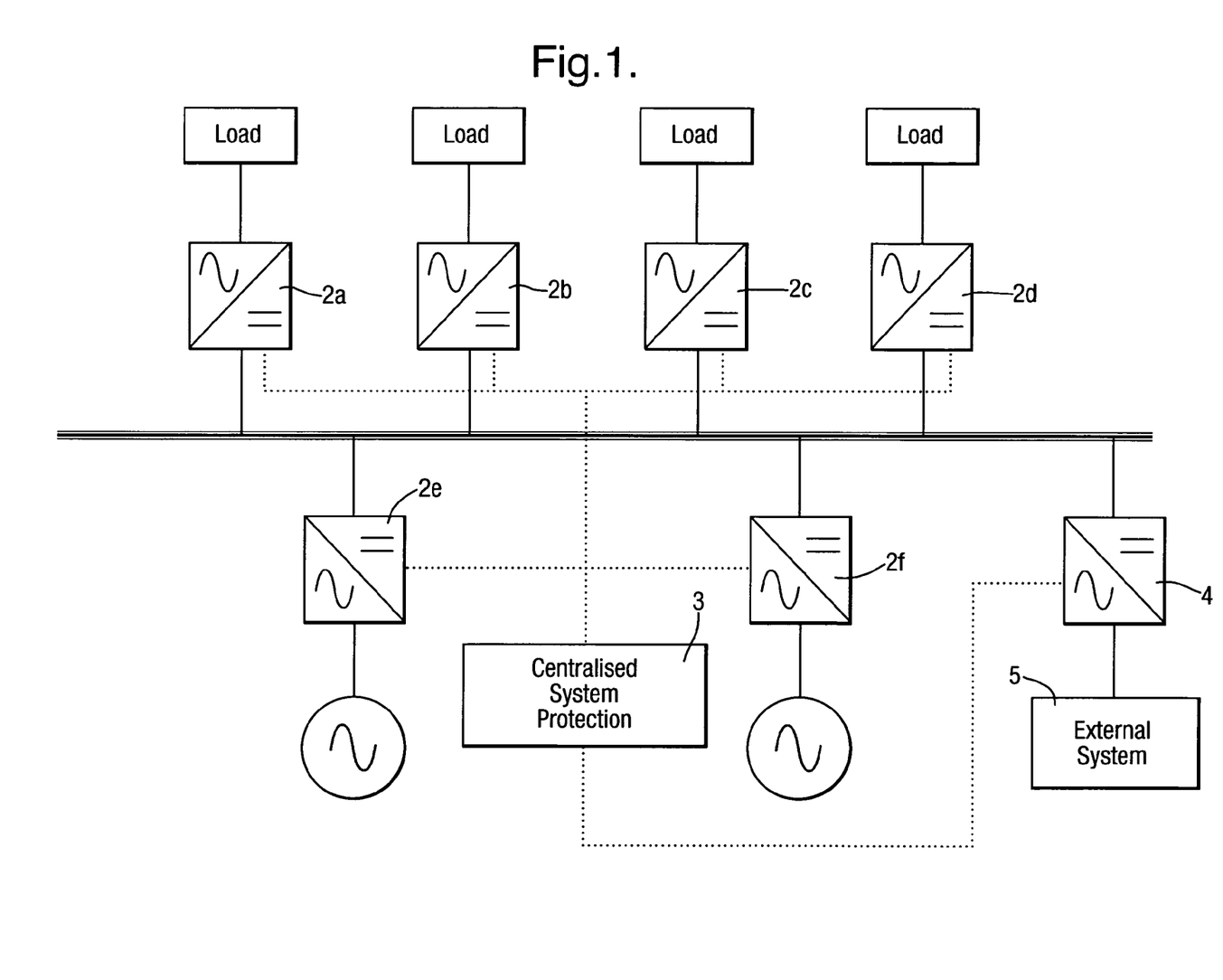
FIG. 1 provides a schematic overview illustrating a DC electrical current busbar with electrical load circuitry and/or devices.

FIG. 1 provides a schematic overview of a DC busbar with electrical load circuitry and generator devices. The busbar 1 as indicated distributes electrical current from the connected sources to a number of load circuits and devices 2. A controller 3 acts through sensors in order to determine electrical loads presented by the circuits 2a, 2b, 2c and 2d and to determine the currents being supplied by the generators 2e, 2f and the current flowing into or from the busbar to some external system 5. Generally the electrical circuits 2a, 2b, 2c and 2d may draw electrical power and generator devices 2e and 2f provide electrical power to the busbar 1. In either event as indicated above in accordance with Kirchhoff's law the summation of all the electrical currents should be essentially zero. Thus in the overview shown in FIG. 1 electrical circuits and devices 2a, 2b, 2c and 2d are shown as net drawers of electrical current from the busbar 1 whilst an electrical device 2e and 2f may be considered a net contributor of electrical power to the busbar possibly from an external system such as an electrical machine 4, or external system 5 or by regenerative operation of certain types of load device.

The present electrical fault detection arrangement may be operated upon a global basis throughout the whole of the busbar 1 or individual electrical circuits or devices 2a, 2b, 2c, 2d, 2e, 2f, 4 and 5 monitored. It will be appreciated that essentially a summation of all the electrical currents in the circuits/devices 2a, 2b, 2c, 2d, 2e, 2f, 4 and 5 is made in order to create a summation value on a global basis throughout the busbar 1 or individual electrical currents by the controller 3 for individual circuits/devices 2a, 2b, 2c, 2d, 2e, 2f, 4 and 5. It will be understood that the present electrical fault protection arrangement is able to provide backup protection functionality to local protection systems for each of the circuits/devices 2a, 2b, 2c, 2d, 2e, 2f, 4 and 5 as measurements of electrical current in all directions to the busbar 1 are available through the controller 3. In such circumstances a backup electrical current protection facility can be implemented within a central fault protection arrangement if over currents or under currents of any individual circuit/device 2a, 2b, 2c, 2d, 2e, 2f, 4 and 5 are detected within a time duration greater than the time duration for the normal global circuit/device protection system.

It will be understood in order to achieve the electrical fault protection arrangement and method in accordance with the present invention a measure of electrical current magnitude and direction must be available in each circuit/device 2a, 2b, 2c, 2d, 2e, 2f, 4 and 5 connected to the busbar 1. It is by summation of the electrical current measurements that any differential can be determined in order to flag an electrical fault and where necessary control an isolation circuit for the busbar 1 or individual electrical circuits/devices.

The present electrical fault protection arrangements as indicated utilise electrical current differentials. These differentials should be relatively stable to transient events and external faults as a summation of all electrical currents should approach zero under most conditions. Thus, it is not necessary to co-ordinate other control and protection systems when an electrical fault is detected. In such circumstances it is possible to utilise relatively fast current measurement speed and sampling rates by the controller 3 in order that there should be no significant transient solution values in the controller 3 from the circuit/devices 2a, 2b, 2c, 2d, 2e, 2f, 4 and 5. The algorithm can provide compensation for transients and/or measurement errors through the use of a configurable stabilising delay in its operation, as presented in flow chart stage 26 of FIG. 2.

Figure 10:
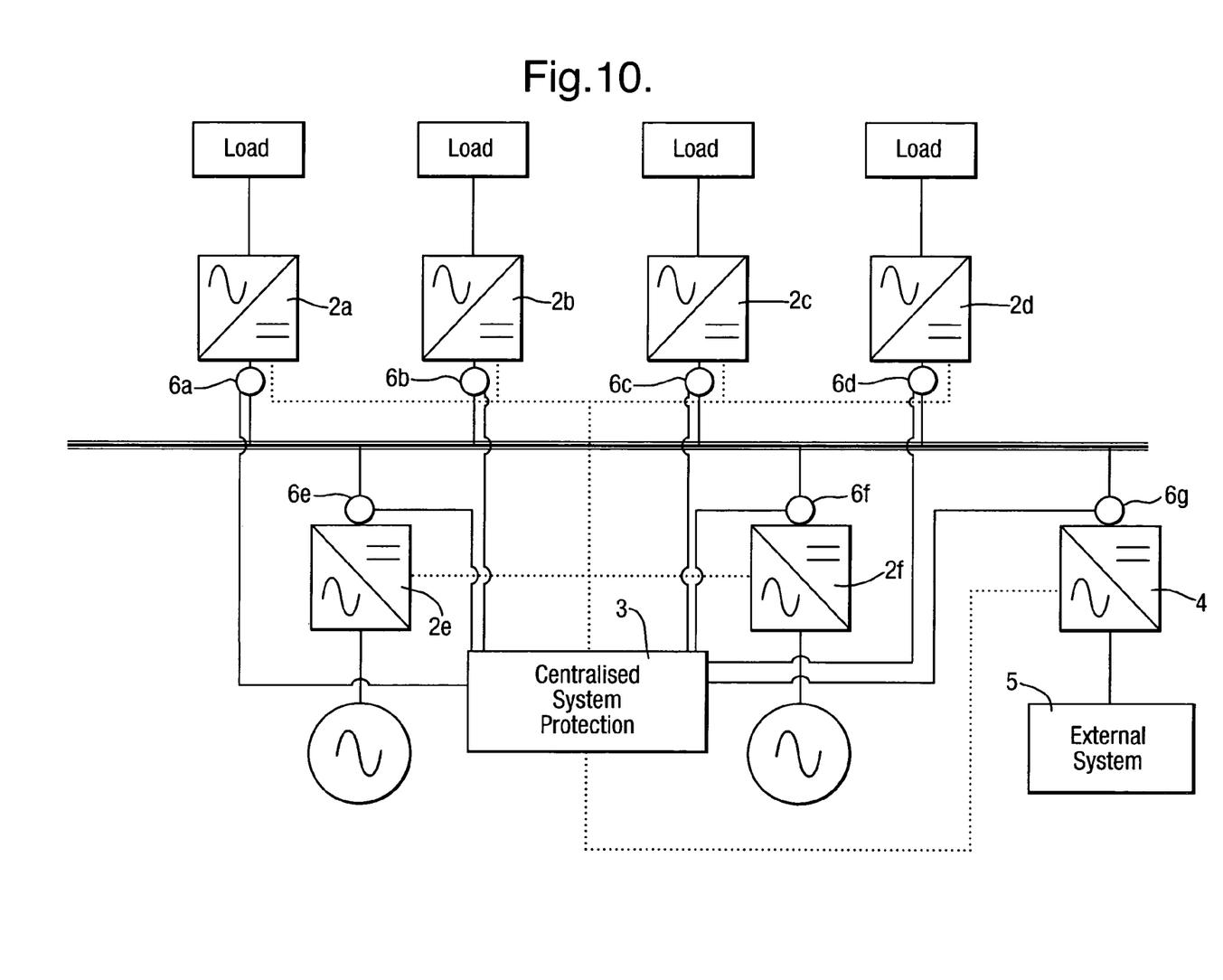
FIG. 10 is a schematic overview illustrating a DC electrical current busbar with electrical load circuitry and/or devices and sensors according to the present invention.

The sensors utilised with regard to determining the electrical current at the circuits/devices 2a, 2b, 2c, 2d, 2e, 2f, 4 and 5 will generally utilise known circuit current measurement technology in order to provide a value which is utilised by the controller 3 for comparison. The positions of the sensors 6a, 6b, 6c, 6d, 6e, 6f and 6g is shown more clearly in FIG. 10.

The summation value for the electrical currents at the circuit/devices 2a 2b, 2c, 2d, 2e, 2f, 4 and 5 will be compared with a threshold value. If the summation is within the threshold value then no signal will be raised by the controller 3 for isolation of the busbar 1. In order to facilitate comparison the controller 3 will generally sample simultaneously the electrical current values received from each of the circuits/devices 2a, 2b, 2c, 2d, 2e, 2f, 4 and 5 and normally through analogue or digital conversion provide a summation value which is compared with the threshold value stored in the controller 3.

Where utilised as a backup system with respect to protection for each circuit/device 2a, 2b, 2c, 2d, 2e, 2f, 4 and 5 the electrical current from that device 2a, 2b, 2c, 2d, 2e, 2f, 4 and 5 will be sampled periodically and through a comparison with a known threshold for that device 2a, 2b, 2c, 2d, 2e, 2f, 4 and 5 a determination made by the controller 3 in order to either provide a control signal to an electrical isolation device for that circuit/device 2a, 2b, 2c, 2d, 2e, 2f, 4 and 5 or not.

It will be apparent when applied to a global electrical fault protection arrangement that sampling of the electrical current from the circuit/device 2a, 2b, 2c, 2d, 2e, 2f, 4 and 5 must be simultaneous. It is important that the electrical current measurements used by the differential protection approach in the controller 3 are taken at the same point in time or false differential currents may be calculated including transient conditions in each or several of the circuit devices 2a, 2b, 2c, 2d, 2e, 2f, 4 and 5. In such circumstances either there will be synchronised simultaneous sampling of electrical currents from the circuit/device 2a, 2b, 2c, 2d, 2e, 2f, 4 and 5 or an appropriate time tag for the sample of the electrical current taken and through known trends in transients an extrapolation made to an adjusted value sample for summation and therefore differential comparison with a threshold value utilised in triggering a control signal for an isolation device.

The isolation device will generally comprise an appropriate power electric interface to cease electrical conduction in the busbar 1 either globally or for an individual circuit/device 2a, 2b, 2c, 2d, 2e, 2f, 4 and 5. Alternatively, a mechanical circuit breaker may be instructed to trip electrical conduction in the busbar 1.

The present electrical fault protection arrangement method depends for global consideration upon as indicated a consideration of Kirchoff's laws with respect to a substantially zero summation at any given moment. In order to achieve this analysis for electrical fault protection it is really necessary to establish electrical current values for all nodes in the system. Thus, a number of electrical current values are determined and it is possible to utilise each of these electrical current values to compare each particular electronic load circuit or device or node position against that expected for that particular device and specifically highlight problems with that particular circuit or device or node. Each individual circuit will contribute to the summation utilised in accordance with Kirchhoff's laws. In such circumstances if there is a particular problem with one circuit or device determination of that particular problem may be isolated before determination of the global summation for all electrical currents at locations within the busbar/circuit arrangement.

Figure 2:
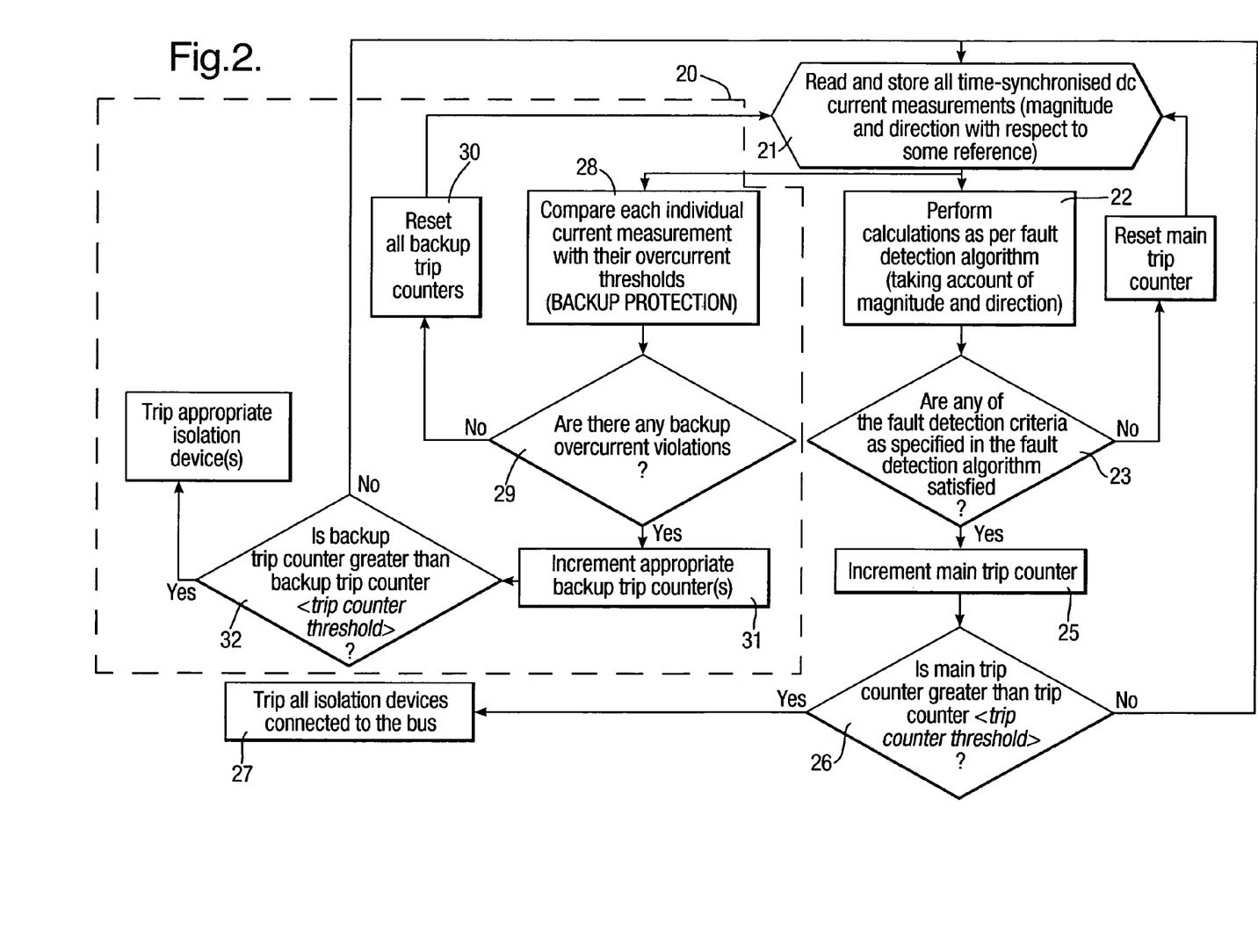
FIG. 2 is a flow diagram illustrating operation of an electrical fault protection arrangement in accordance with the present invention.

FIG. 2 provides a flow chart illustrating respectively process stages with regard to global electrical fault protection and individual circuit/device fault detection in the box contained within the broken line 20. As indicated above simultaneous measurements of electrical currents is important in order to avoid potential spurious results. In such circumstances as indicated each electrical current will be sampled typically from an analogue sensor signal. It will be understood that processing cannot be performed in real time against all electrical current values therefore as illustrated at process stage 21 the sampled electrical current values will be read and stored in a time synchronised way in terms of magnitude and direction. These signals can then be utilised in accordance with both the global electrical fault protection arrangement method as well as individual electrical load circuit/device fault determinations.

In the global fault protection arrangement all the electrical currents will be summed at process stage 22 taking account of both their magnitude and direction in order to provide a summation value. This summation value in a further processing stage 23 will be compared relative to an expected or allowable current deviation threshold. As indicated above Kirchoff's law is a consideration at an ideal state but in reality there will be electrical transmission losses and otherwise leading to a less than ideal zero summation. This deviation is accommodated within a pre-determined differential current threshold value. This comparison is performed by a controller in the stage 23.

The process stage 23 being a comparison provides either a negative comparison result, that is to say the comparison within the range defined by the current threshold value so that a controller trip counter is reset to begin gathering and sampling of electrical current values again at process stage 21, or a positive comparison when the comparison exceeds the range of the current threshold value. If the result of the process stage 23 is to show that the summation yield is greater than the acceptable differential current threshold then a positive yes result is provided and a trip counter is incremented in a process stage 25. In order to avoid potential problems with short term deviations a trip counter threshold is set. This trip counter threshold acts to ensure that there must be a repeated number of positive comparisons with the differential current threshold before activation of electrical isolation. In such circumstances in a process step 26 a comparison of the trip counter and value with the trip counter threshold is made such that if a negative result is provided it will again return to the processing step 21 where electrical current values are sampled, stored and made available for processing. If the main trip counter value is attained then a positive result is achieved and the controller is arranged to provide control signals to an isolation device to terminate connections of the whole global busbar distribution system. It will be understood even though the trip threshold has not been attained that the fact that the differential has been exceeded it will be recorded for analysis and reporting for maintenance and service.

With respect to a specific electric load circuit or device as indicated the procedure is encapsulated within the box shown in FIG. 2 defined by broken line 20. Thus, each individual electrical current measurement is compared with an over current threshold for the circuit or device in a process step 28. If there are any over current comparison these are determined in process step 29. A negative result causes re-setting of the back up trip counter 30. A positive result as previously results in incrementation of a back up trip counter 31.

In order to avoid transients causing isolation of electrical load circuits and devices a trip counter threshold is set. Thus, a number of back up over current violations, that is to say comparisons which exceed a threshold value, will be required before a positive result is provided by a process step 32 in a controller so that a control signal causes operation of an isolation device. Implementation of the back up trip counter but failure in the process step 32 in order to reach the trip counter threshold results in a negative result and therefore return to sampling and storing electrical current values at process step 21.

It will be appreciated that the same data set of electrical current values simultaneously acquired can be utilised with regard to the global busbar protection system and individual electrical circuit load values. In such circumstances a back up protection system is provided for those electrical load circuits and devices whilst the whole arrangement including the busbar is protected by the global arrangement.

It will be appreciated that the performance of the electrical fault protection arrangement depends upon the accuracy of electrical current measurements and the rate at which the electrical current measurements are synchronistically sampled. In such circumstances the highest practical accuracy levels and sampling rates for the electrical current values in a particular situation will be utilised.

As indicated previously the level of security with regard to the electrical fault protection arrangement and method will be dependent upon the particular trip counter threshold values set respectively. Setting these thresholds as one will result in isolation of the whole busbar or electrical circuit/device upon a single significant deviation from the expected result. Such an arrangement would generally be unacceptable in normal operational circumstances and therefore the differential current threshold value and trip counter threshold values will be set dependent upon particular operation requirements. The differential current threshold affects a sensitivity of the protection arrangement in totality and therefore particular care should be taken with regard to this value. A balance should be struck between sufficient sensitivity to be practicable and efficient whilst avoiding spurious violations as a result of the transient defects. The back up trip counter threshold is effective with respect to one or potentially only a group of electrical load circuits or devices and therefore has more limited effect with regard to global performance of the whole arrangement. It will be understood that the values for the differential current threshold and trip counter threshold will be highly dependent upon the accuracy of the sensors utilised and the sampling rates achieved with regard to the electrical currents taken from various locations in the arrangement.

Particularly with regard to utilisation of the present arrangement for back up protection for an electrical load circuit or device it will be understood that individual over current thresholds utilised in process step 29 and trip counter threshold utilised in process step 32 will be set for particular electrical load circuits and devices. The settings will generally be dependent upon the requirements of the particular circuit or device and will be chosen to co-ordinate with existing main protection settings for the subject electronic devices and other protective functions associated with each of the load/source devices to the busbar distribution arrangement.

The present electrical fault protection arrangement as indicated above is particularly applicable to aerospace applications but it will be appreciated in principle it could be applied in any domain where direct point busbar connected sources and loads are constructed. In such circumstances the fault protection arrangement may be applied in applications such as aircraft power systems, aero engine power systems, marines systems, electrical vehicle systems and other direct current distribution arrangements.

Upon examination it is clear that, for the example a total of six current measurements, three from each busbar rail, should be made to find electrical faults. FIGS. 3 to 9 present examples of possible faults and algorithms for decision making are outlined below. These algorithmic interrogations will be carried out in order to determine whether no fault exists or whether one of the various alternative fault conditions is deemed to exist. FIGS. 3 through 9 qualitatively illustrate the current flows for the various conditions that may be detected using the techniques presented in this document.

As indicated above in accordance with Kirchoff's rules if there are no electrical faults then there should be a zero value for all vectorial summations at nodes in the electrical circuits.

Six scenarios with regard to the vectorial summations are outlined below.

Scenario 1. No fault on busbar or connected dc circuits $l_1 + l_2 + l_3 = 0$ $l_1' + l_2' + l_3' = 0$ $l_1 = -l_1'$ $l_2 = -l_2'$ $l_3 = -l_3'$ $l_0 = 0$ Scenario 2. Busbar fault (rail-rail, may also be rail-earth-rail)

$l_1 + l_2 + l_3 <> 0$ and $l_1' + l_2' + l_3' <> 0$

Scenario 3. Busbar fault (+ve rail-earth)

$l_1 + l_2 + l_3 <> 0$ and $l_1' + l_2' + l_3' = 0$ (dependent on earthing configuration)

and $l_0 >$ threshold (dependent on earthing configuration)

Scenario 4. Busbar fault (−ve rail-earth)

$l_1' + l_2' + l_3' = 0$ and $l_1 + l_2 + l_3 <> 0$ (dependent on earthing configuration)

and $l_0 >$ threshold (dependent on earthing configuration)

Scenario 5. dc load supply circuit earth faults (on dc circuits connected to busbar, will not detect faults on load/source-side of converter)

$l_1 <> -l_1'$ (Earth fault on dc load circuit 1)

$l_2 <> -l_2'$ (Earth fault on dc load circuit 2)

$l_3 <> -l_3'$ (Earth fault on dc load circuit 3)

$l_2 <> -l_2'$ (Earth fault on dc load circuit 2)

$I_0 >$ threshold (dependent on earthing configuration)

Scenario 6. dc load supply circuit line-line faults or load fault (on load-side of converter, may not always function due to converter fault-current limiting action)

$l_2 >$ threshold (Fault on load a)

$l_3 >$ threshold (Fault on load b)

$I_0$>threshold (for earth faults, but dependent on earthing configuration)

Figure 3:
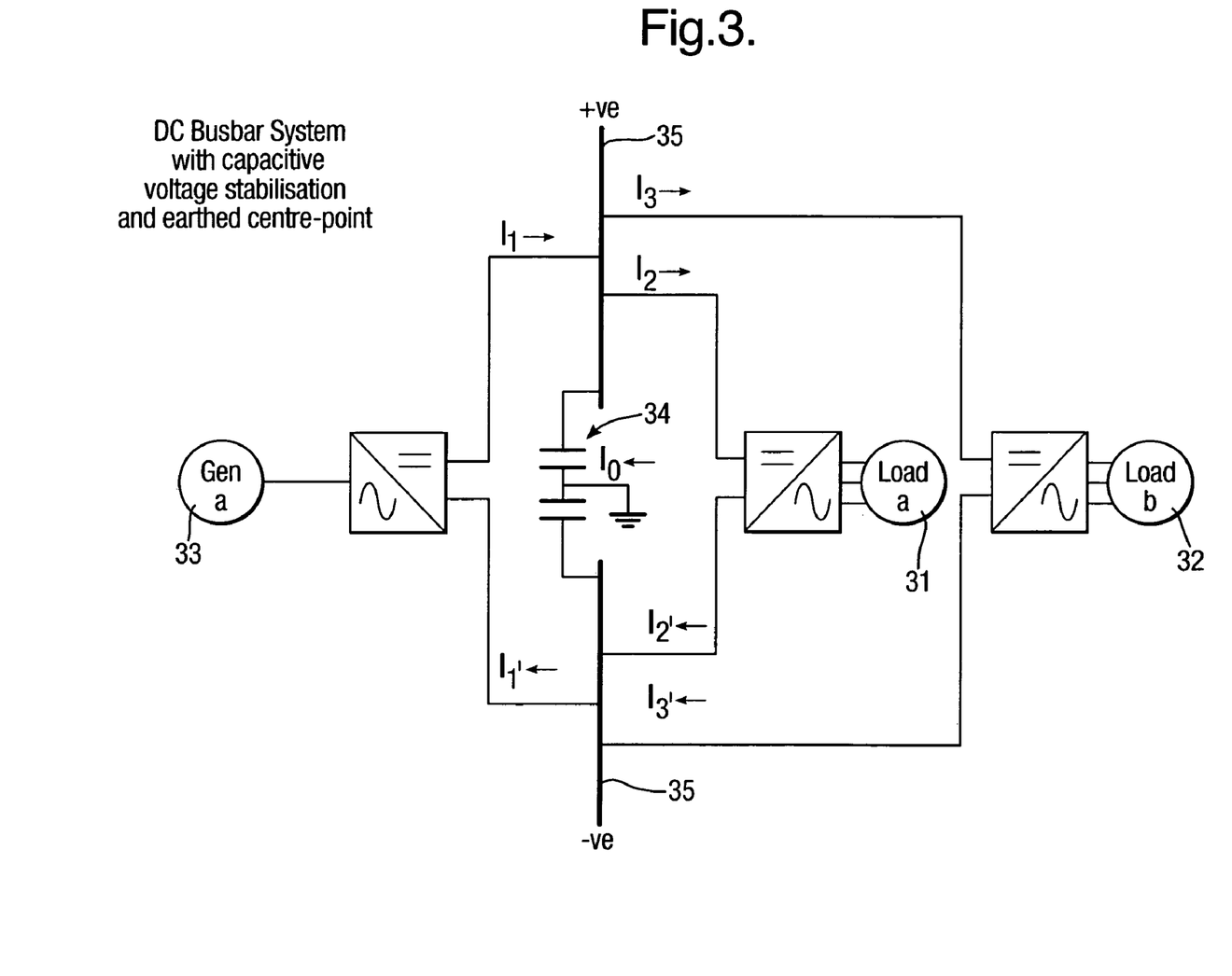
FIG. 3 is a schematic illustration of an electrical distribution system encompassing capacitive voltage stabilisation with an earthed centre point of the stabilisation system; this schematic is used to describe electrical fault detection scenarios for aspects of the present invention.

FIG. 3 illustrates a typical busbar distribution arrangement with capacitive voltage stabilisation and an earth centre point. In such circumstances in accordance with scenario 1 above there will be no fault on the busbar or connected DC circuits, 31, 32 or electrical generator 33 such that busbar segments 35 either side of the earthed centre point 34 are arranged in accordance with scenario 1 above.

It would be appreciated that electrical current measurement locations should generally be made as physically close to the busbar 35 as possible as these will define the busbar protection boundaries. It should also be stressed that electrical current shown flowing into, that is to say, pointed towards the busbar 35 should be considered positive whilst electrical currents that are flowing away, arrowheads away from the busbar 35 should be considered negative.

Figure 4:
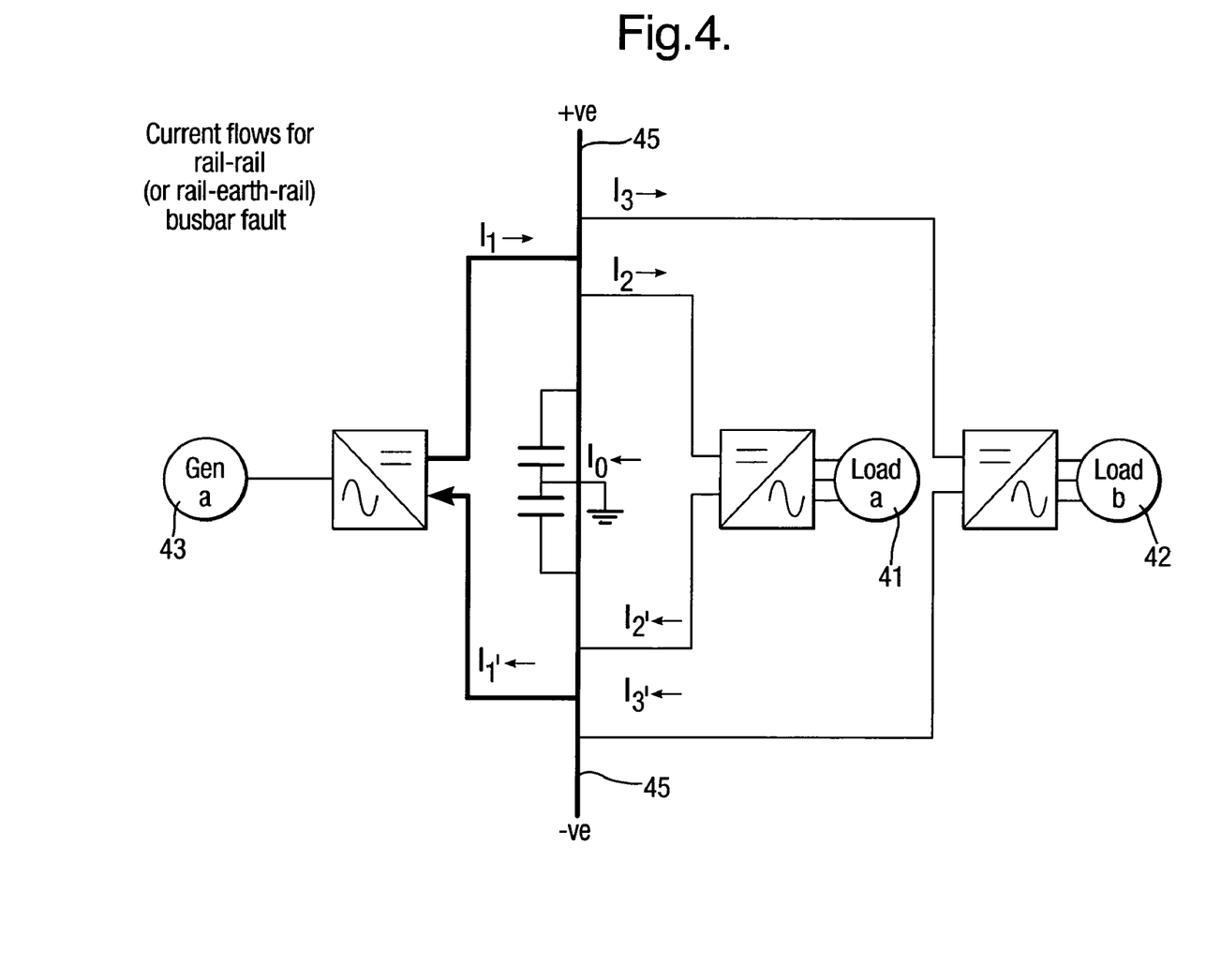
FIG. 4 is a schematic illustration of current flows for a rail to rail or a rail to earth to rail busbar electrical fault in accordance with aspects of the present invention.

FIG. 4 illustrates scenario 2 above in which a busbar 45 has a fault either rail to rail or possibly rail to earth to rail and therefore the electrical loads 41, 42 and electrical power generator 44 are not in balance such that the electrical currents $l_1+l_2+l_3$ are less than or greater than 0 and similarly the electrical currents $l_1'+l_2'+l_3'$ are less than or greater than 0. In such circumstances by this algorithmic analysis determination of a busbar fault which is either rail to rail or rail to earth to rail can be determined.

Figure 5:
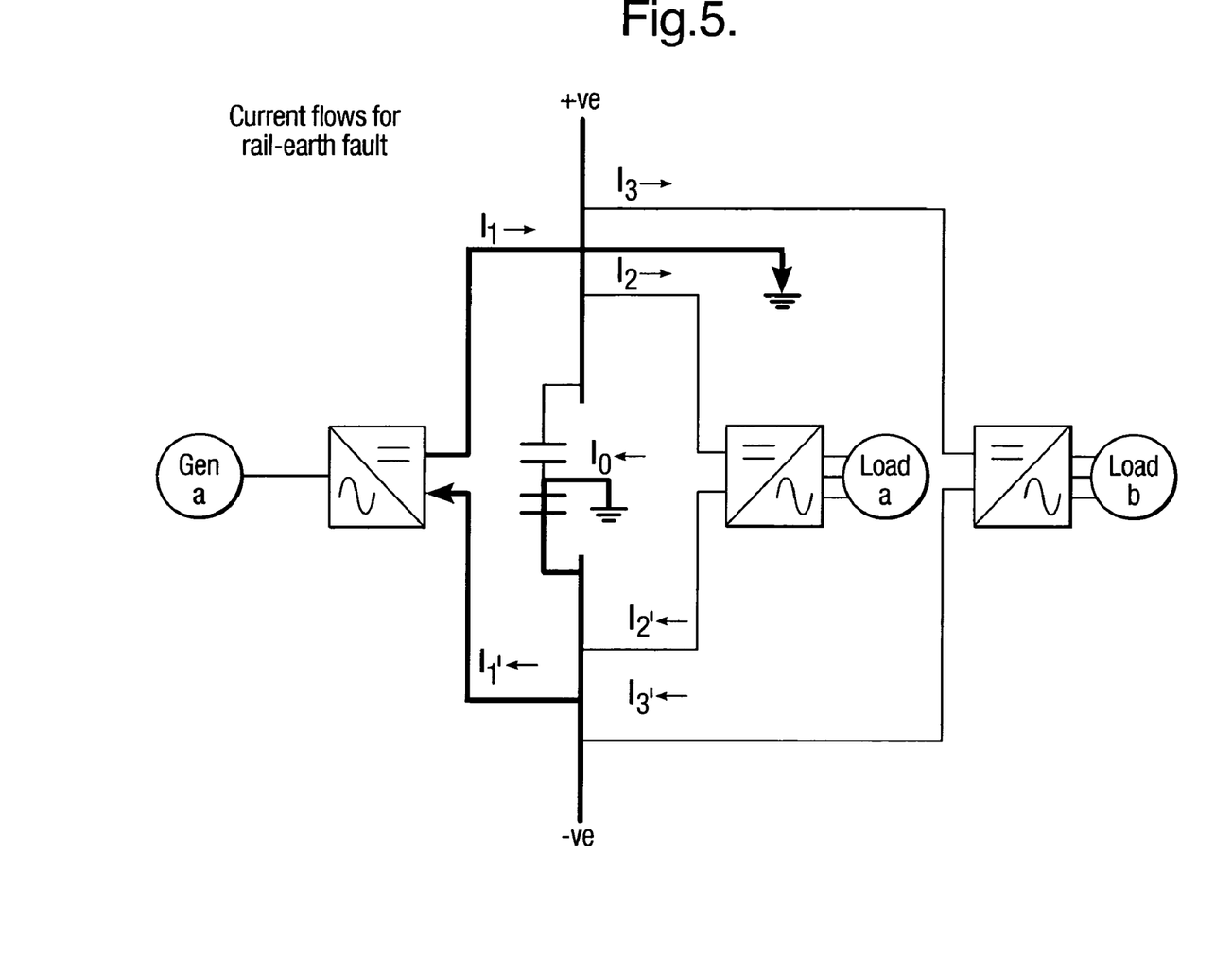
FIG. 5 is a schematic illustration of current flows for a rail to earth electrical fault in accordance with aspects of the present invention.

FIG. 5 illustrates a busbar fault in which there is a rail to earth electrical fault. In such circumstances in accordance with the scenario 3 above there will be a situation where electrical currents $l_1+l_2+l_3$ are less than or greater than 0 and electrical currents $l_1'+l_2'+l_3'$ is equal to 0 depending upon earthing configuration and $l_0$ is greater than a threshold again dependent upon earthing configuration. In such circumstances by an appropriate parasmetic analysis this form of busbar fault, that is to say rail to earth fault can be determined and appropriately flagged.

Figure 6:
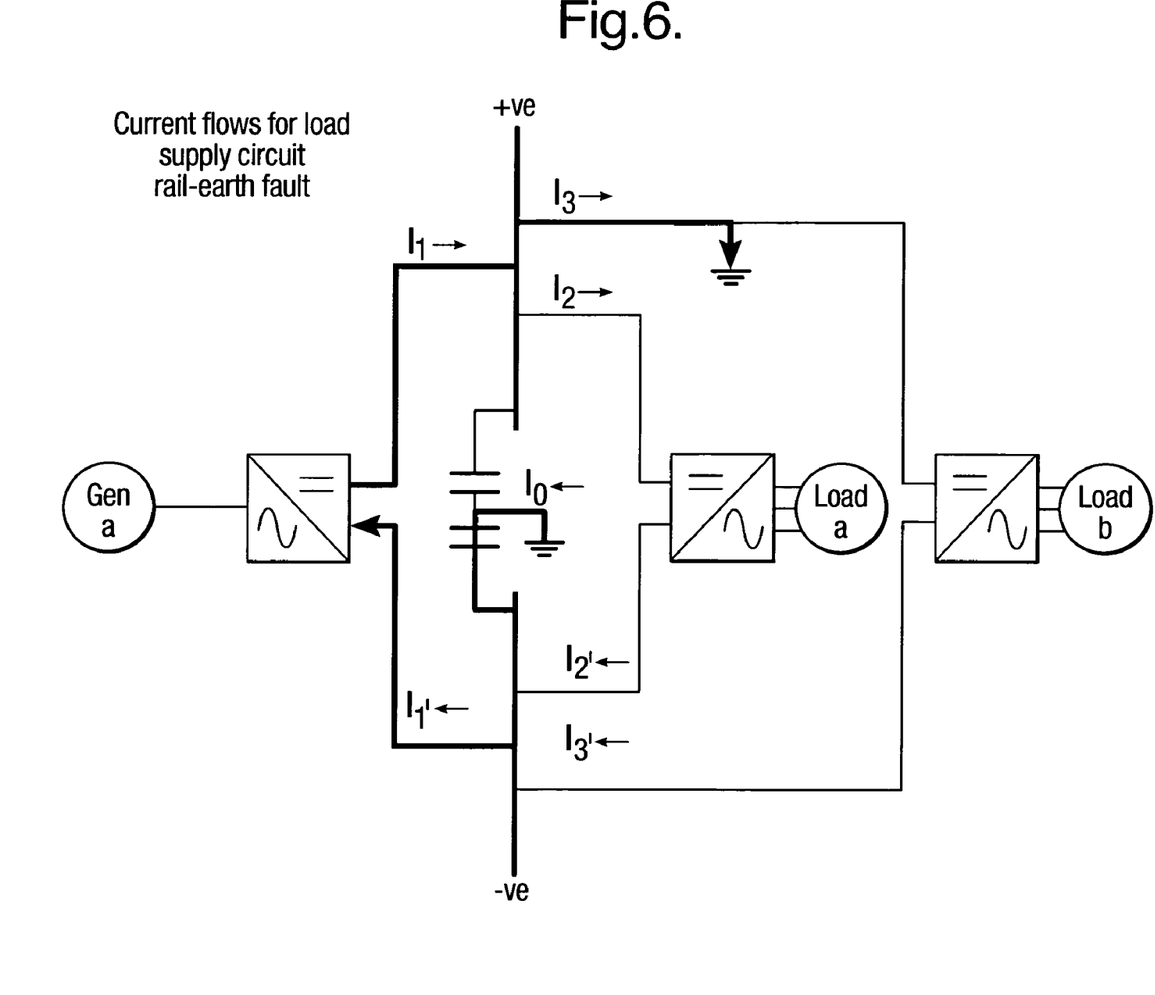
FIG. 6 is a schematic illustration of current flows for a rail to earth electrical fault in accordance with aspects of the present invention.

FIG. 6 illustrates a rail to earth negative fault which is reciprocal to that described through to FIG. 5, as $l_1'+l_2'+l_3'$ is less than or greater than 0 and $l_1+l_2+l_3$ is equal to 0 depending upon earthing configuration and $l_0$ greater than a threshold again depending upon earthing configurations. In such circumstances a negative rail to earth fault can be determined by appropriate algorithmic analysis.

Figure 7:
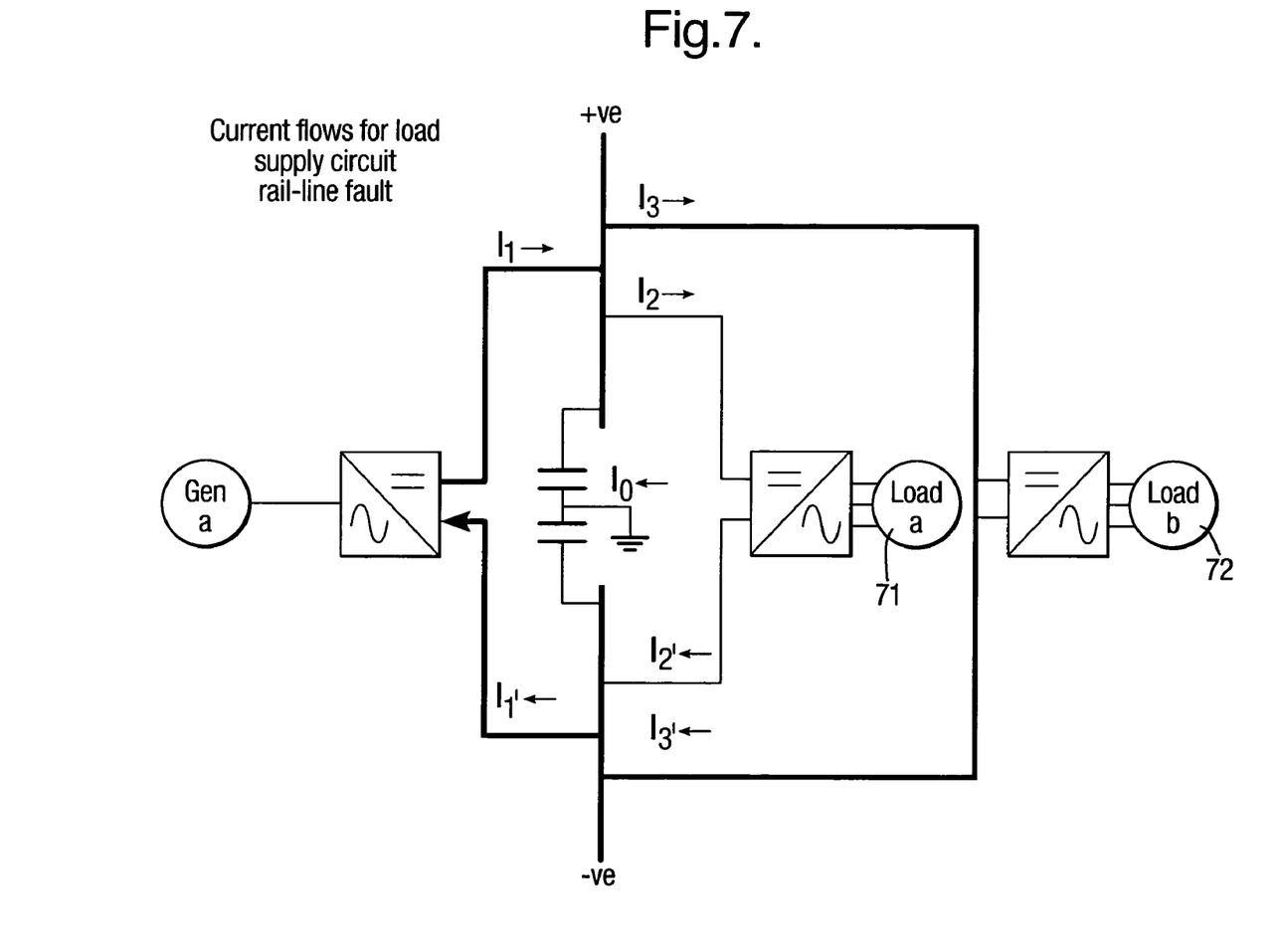
FIG. 7 is a schematic illustration of electrical current flows for a line to line electrical fault in accordance with aspects of the present invention.
Figure 8:
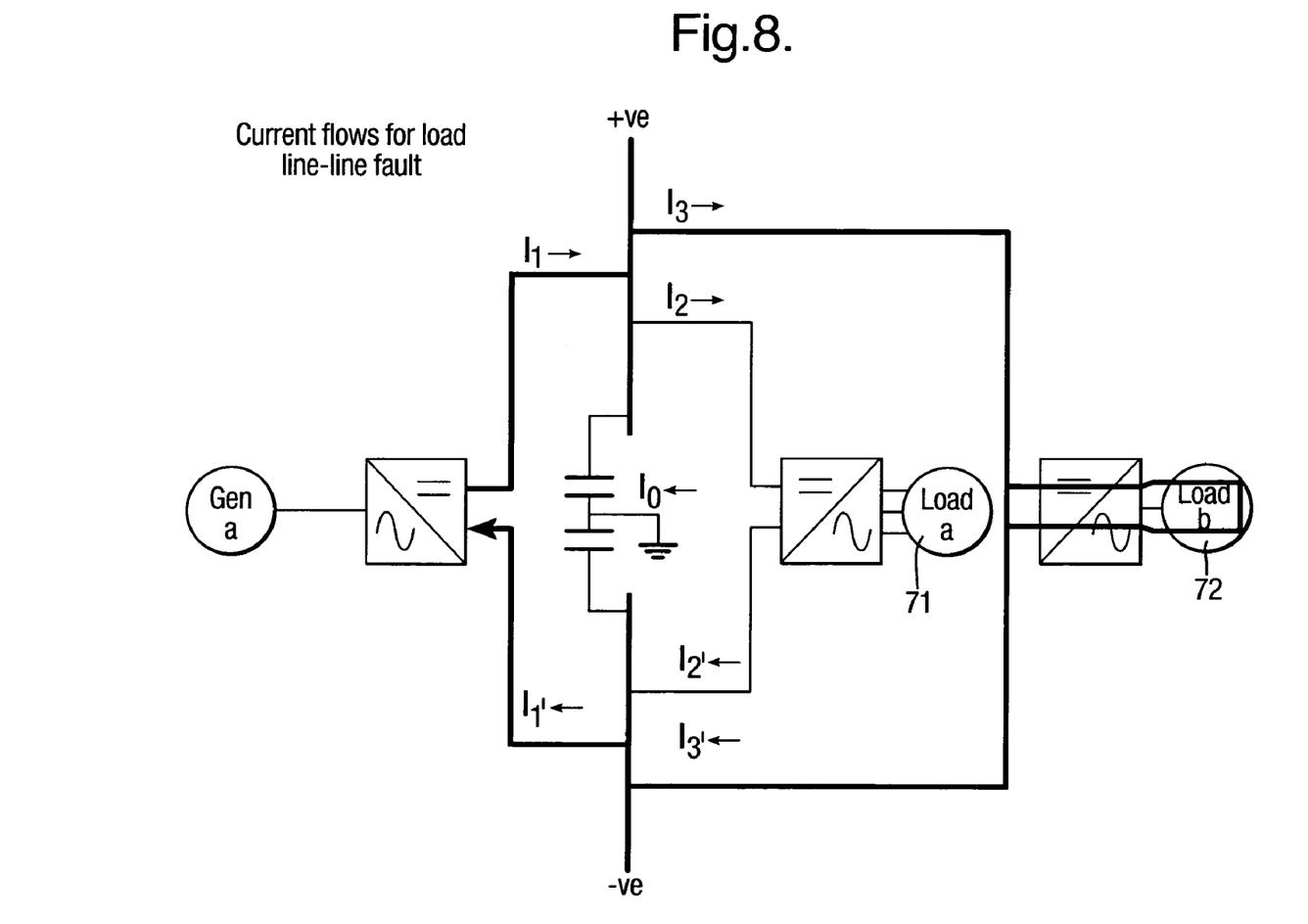
FIG. 8 is a schematic illustration of electrical current flows for a line to line electrical fault in accordance with aspects of the present invention.

FIGS. 7 and 8 respectively illustrate dc load supply circuit line to line faults and load faults in accordance with scenario 6 above. Thus if $l_2$ is greater than a threshold value there is an electrical fault is determined in load 71 whilst if electrical current $l_3$ is greater than a threshold value then there is a fault on load 72. If $l_0$ is greater than a threshold then there will be an earth fault dependent upon the earthing configuration of the situation.

Figure 9:
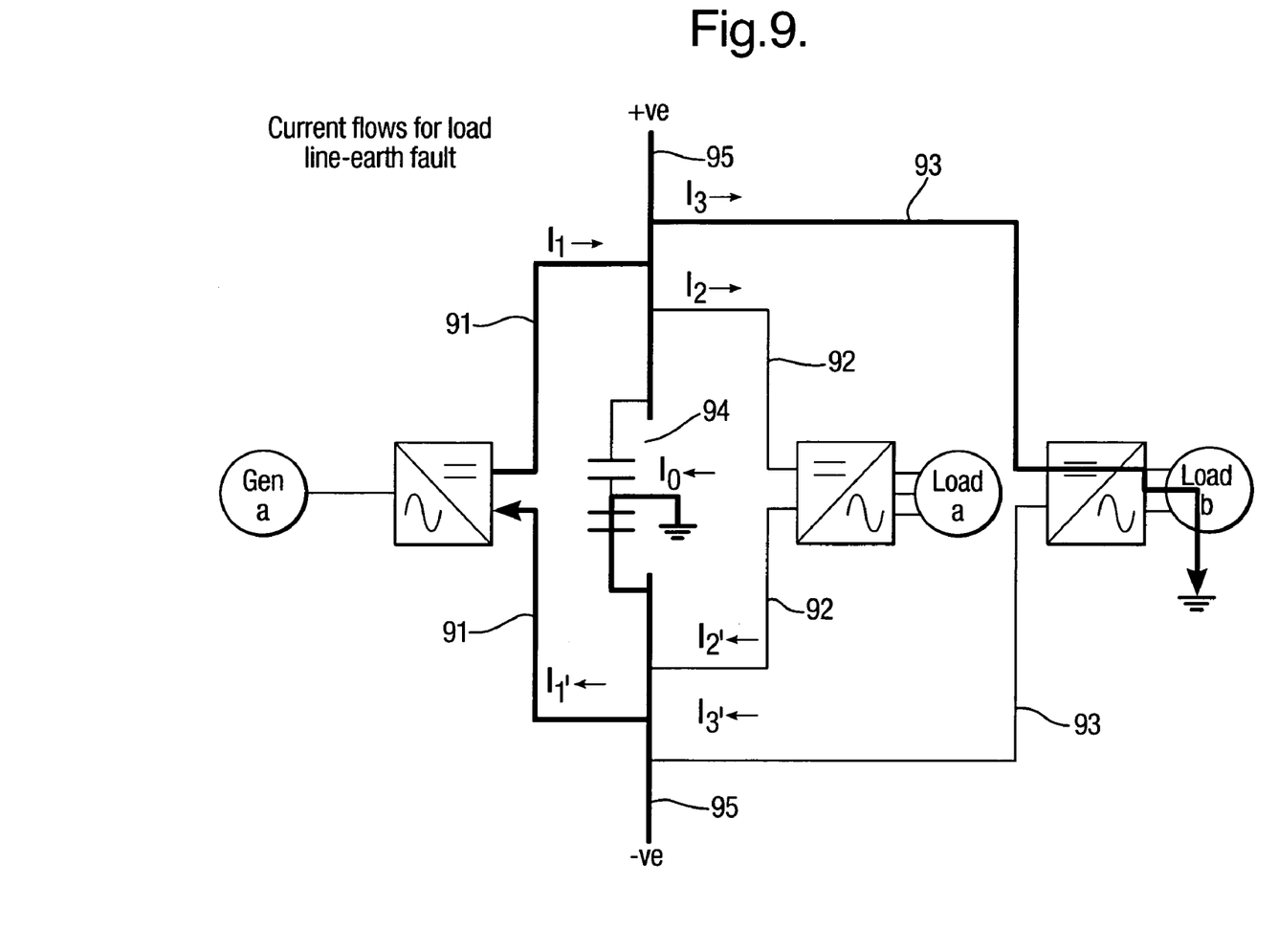
FIG. 9 is a schematic illustration of electrical current flows for a line to earth electrical fault in accordance with aspects of the present invention.

FIG. 9 illustrates a line to earth electrical fault in accordance with scenario 5 above. If $l_1$ is greater than or less than $-l_1'$ there is an earth fault on the dc load circuit 91 passing through the busbar 95. If $l_2$ is less than or greater than $-l_2'$ then there is an earth fault on the dc load circuit 92 incorporating the busbar 95. If $l_3$ is less than or greater than $-l_3'$ there is an earth fault on the dc load circuit 93 incorporating the busbar 95. If $l_0$ is greater than a threshold then depending upon earth configuration there is an electrical fault in that earth 94.

Figure 11:
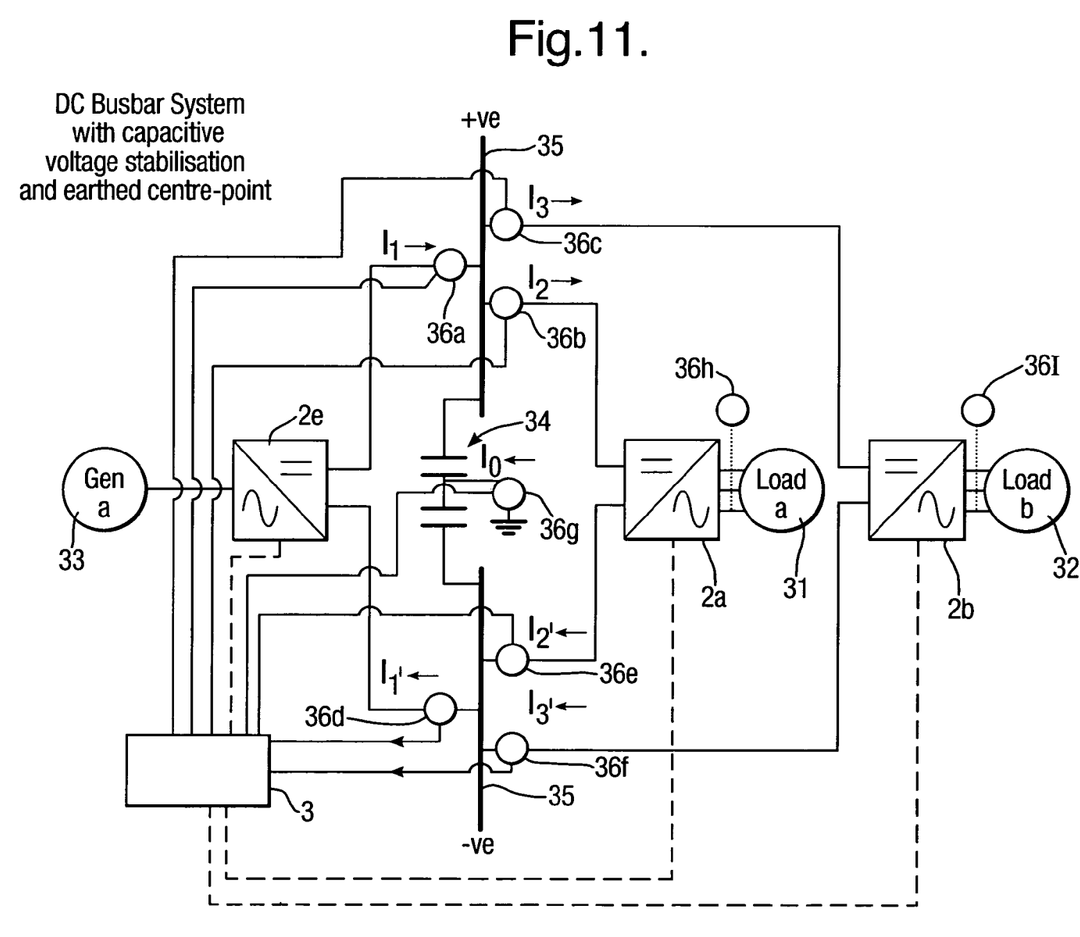
FIG. 11 is a schematic illustration of an electrical distribution system encompassing capacitive voltage stabilisation with an earthed centre point of the stabilisation system and with sensors. This schematic is used to describe electrical fault detection scenarios for aspects of the present invention.

FIG. 11 illustrates the typical busbar distribution arrangement with capacitive voltage stabilisation and an earth centre point as in FIG. 3, but also shows the sensors 36a, 36b, 36c, 36d, 36e, 36f and 36g to measure the currents $I_1$, $I_2$, $I_3$, $I_1'$, $I_2'$, $I_3'$ and $I_o$ respectively.

The sensors are current transducers and as shown located in the circuits as close to the busbar as possible, however, it may be possible to provide the sensors within the converter for an electrical device/circuit. As mentioned previously the power electronics for an electrical device/circuit may provide the local electrical fault protection or part of the global electrical fault protection.

Thus there is a measurement of current magnitude and direction of flow from every electrical circuit connected to the busbar in order for the differential protection function to be implemented.

The present invention is applicable for use in aerospace applications, aircraft, aircraft engines and marine applications, ships and ship engines.

It will be understood by the above appropriate algorithm interrogation processes the determination first of all of an electrical fault can be determined and then the probable source of that electrical fault determined by iterative comparison of the electrical currents at various nodes within the circuitry. This interrogation will typically occur within the arrangement as depicted in FIG. 2 and particularly at the comparison stage 28.

Alterations and modifications to the embodiments of the invention described above will be understood by those skilled in the art. Thus, the data set of electrical current values can be utilised as indicated to provide a global electrical fault protection arrangement and method or protection for individual electrical devices or power sources or a selected group of such electrical load circuits and devices.

We claim:

1. An electrical fault protection arrangement including
a busbar,
at least one source of direct electrical current connected to the busbar,
at least one electrical load circuit connected to the busbar,
a plurality of sensors to obtain electrical current values, the sensors being arranged to obtain electrical current values for all electrical currents entering the busbar and all electrical currents leaving the busbar,
a controller coupled to the sensors to receive all of the electrical current values, the controller is arranged to sum all the electrical current values from all the sensors to produce a summation value, the controller is arranged to compare the summation value with a threshold value stored in the controller for a first time duration, to provide a control signal for controlling an isolation device to electrically isolate the busbar,
said controller being arranged to compare electrical current values for the at least one electrical load circuit with an expected value stored in the controller for a second time duration to provide a control signal for controlling an isolation device to electrically isolate the at least one electrical load circuit wherein said second time duration is greater than said first time duration.

2. An arrangement as claimed in claim 1 wherein the controller includes a counter to count the number of times the control signal is provided before the isolation device is controlled to electrically isolate the busbar.

3. An arrangement as claimed in claim 1 wherein the controller includes a counter to count the number of times the control signal is provided, before the isolation device is controlled to electrically isolate the at least one electrical load circuit.

4. An arrangement as claimed in claim 1 wherein there are a plurality of electrical load circuits.

5. An arrangement as claimed in claim 1 wherein the electrical load circuit includes an electrical device.

6. An arrangement as claimed in claim 1 wherein the sensors are arranged to obtain electrical current values in terms of magnitude and direction.

7. An arrangement as claimed in claim 1 wherein the electrical fault protection arrangement is arranged on an aircraft or a ship.

8. A method of electrical fault protection for an arrangement comprising a busbar, at least one source of direct electrical current connected to the busbar and at least one electrical load circuit connected to the busbar, the method comprising:
   a) sensing electrical current values for all electrical currents entering the busbar and all electrical currents leaving the busbar,
   b) summing all the electrical current values to produce a summation value,
   c) comparing the summation value with a threshold value over a first time duration to provide a control signal for controlling an isolation device for the busbar dependent upon the comparison between the summation value and the threshold value,
   d) comparing electrical current values of the at least one electrical load circuit with an expected value over a second time duration to provide a control signal for controlling an isolation device for the at least one electrical load circuit dependent upon the comparison between the electrical current values and the expected value, wherein said second time duration is greater than said first time duration.

9. A method as claimed in claim 8 comprising counting the number of times the control signal is provided before the isolation device is controlled to electrically isolate the busbar.

10. A method as claimed in claim 8 comprising counting the number of times the control signal is provided before the isolation device is controlled to electrically isolate the at least one electrical load circuit.

11. A method as claimed in claim 8 wherein there are a plurality of electrical load circuits.

12. A method as claimed in claim 8 wherein the electrical load circuit includes an electrical device.

13. A method as claimed in claim 8 comprising sensing the electrical current values in terms of magnitude and direction.

14. A method as claimed in claim 8 wherein the arrangement is arranged on an aircraft or a ship.

* * * * *